US010453280B2

(12) United States Patent
Kontturi

(10) Patent No.: US 10,453,280 B2
(45) Date of Patent: Oct. 22, 2019

(54) METHOD AND SYSTEM FOR CONTROLLING ACCESS IN AN ENVIRONMENT

(71) Applicant: KONE Corporation, Helsinki (FI)

(72) Inventor: Risto Kontturi, Helsinki (FI)

(73) Assignee: KONE CORPORATION, Helsinki (FI)

(*) Notice: Subject to any disclaimer, the term of this patent is extended or adjusted under 35 U.S.C. 154(b) by 0 days.

(21) Appl. No.: 15/868,287

(22) Filed: Jan. 11, 2018

(65) Prior Publication Data

US 2018/0158267 A1    Jun. 7, 2018

Related U.S. Application Data

(63) Continuation of application No. PCT/EP2015/070403, filed on Sep. 7, 2015.

(51) Int. Cl.
| | |
|---|---|
| G07C 9/00 | (2006.01) |
| H04W 4/33 | (2018.01) |
| H04L 29/06 | (2006.01) |

(52) U.S. Cl.
CPC ...... *G07C 9/00111* (2013.01); *G07C 9/00103* (2013.01); *G07C 9/00309* (2013.01);
(Continued)

(58) Field of Classification Search
CPC ............ G07C 9/00111; G07C 9/00103; G07C 9/00309; G07C 2009/00325;
(Continued)

(56) References Cited

U.S. PATENT DOCUMENTS

2012/0280783 A1* 11/2012 Gerhardt ............ G07C 9/00309
340/5.6
2013/0206517 A1*  8/2013 De Jong ................ B66B 1/2458
187/381
(Continued)

FOREIGN PATENT DOCUMENTS

| DE | 101 47 936 A1 | 4/2003 |
|---|---|---|
| EP | 2 085 934 A1 | 8/2009 |

(Continued)

OTHER PUBLICATIONS

English language translation of Neumann, DE 10147936, Priority date Sep. 28, 2001 (Year: 2001).*
(Continued)

*Primary Examiner* — Edwin C Holloway, III
(74) *Attorney, Agent, or Firm* — Birch, Stewart, Kolasch & Birch, LLP

(57) ABSTRACT

A method for controlling access in an environment, including the use of an access control system to lock/unlock access devices in the environment, which control system is configured to communicate via a short range communication system with at least one first mobile phone of a first user wanting to get access to at least one access-restricted area of said environment, and which control system is configured to communicate with a second communication device of a second user located in said environment and holding access rights to said area. After the first user enters the environment, the control system initiates the first mobile phone via the short range communication system to send an access request to the second communication device, which access request includes a unique ID of the first mobile phone. The control system is initiated via the second communication device to grant access rights to the holder of the first mobile phone by the second communication device forwarding access data to the control system comprising the unique ID of the first
(Continued)

mobile phone and/or by the second communication device sending unlock data directly to the first mobile phone via a public communication network, which enables the first mobile phone to unlock at least those access devices which are located on a route between the location of the first mobile phone and the location of the second communication device. The unlocking is based on a short range communication of the first mobile phone with short range communication devices located in the vicinity of the access devices.

16 Claims, 1 Drawing Sheet

(52) U.S. Cl.
CPC .... *H04W 4/33* (2018.02); *G07C 2009/00325* (2013.01); *G07C 2009/00769* (2013.01); *G07C 2209/08* (2013.01); *H04L 63/0853* (2013.01); *H04L 63/101* (2013.01)

(58) Field of Classification Search
CPC ..... G07C 2009/00769; G07C 2209/08; H04W 4/33; H04L 63/0853; H04L 63/101
USPC ........................................................ 340/5.61
See application file for complete search history.

(56) References Cited

U.S. PATENT DOCUMENTS

| 2014/0266573 A1* | 9/2014 | Sullivan ............. G07C 9/00571 340/4.32 |
| 2015/0179012 A1* | 6/2015 | Sharpe ............... G07C 9/00904 340/5.28 |
| 2015/0221147 A1* | 8/2015 | Daniel-Wayman .......................... G07C 9/00103 340/5.54 |
| 2016/0035161 A1* | 2/2016 | Friedli .................... B66B 1/468 340/5.28 |
| 2016/0284139 A1* | 9/2016 | Klein .................... G06F 16/951 |

FOREIGN PATENT DOCUMENTS

| WO | WO 2008/048020 A1 | 4/2008 |
| WO | WO 2011/141627 A1 | 11/2011 |

OTHER PUBLICATIONS

International Search Report (PCT/ISA/210) issued in PCT/EP2015/070403, dated Jun. 7, 2016.
Written Opinion (PCT/ISA/237) issued in PCT/EP2015/070403, dated Jun. 7, 2016.

* cited by examiner

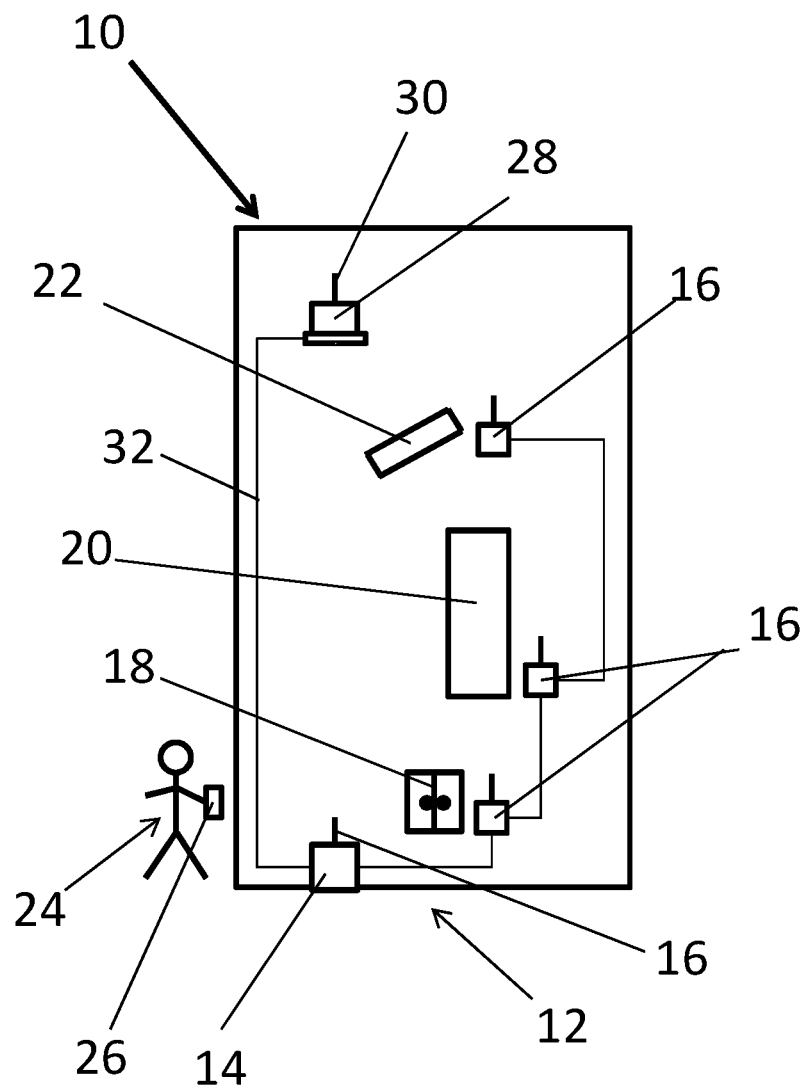

METHOD AND SYSTEM FOR CONTROLLING ACCESS IN AN ENVIRONMENT

CROSS REFERENCE TO RELATED APPLICATIONS

This application is a Continuation of PCT International Application No. PCT/EP2015/070403, filed on Sep. 7, 2015, which is hereby expressly incorporated by reference into the present application.

BACKGROUND OF THE INVENTION

The present invention relates to a method for controlling access in an environment, for example in a building, in a fair area, airport, office building or the like. The invention is particularly directed to environments having access-restricted areas which are not open to the public. The problem of such environments is the visitor management which usually requires the registration of each visitor at the lobby in an access control system of the environment, whereafter access devices as for example elevators, escalators and doors are unlocked for said visitor on his route from the lobby to the destination point in the environment. One problem of this known method is that the access control system is loaded with a number of visitor registrations and with the handling of the access devices on their routes to their destinations.

SUMMARY OF THE INVENTION

It is object of the present invention to provide a method and a system for controlling access in an environment which allow an easy visitor handling.

The object is solved with a method according to claim 1 and with a system according to claim 15. Preferred embodiments are subject-matter of the dependent claims.

Some inventive embodiments and also some inventive combinations of the various embodiments are presented in the descriptive section and in the drawings of the present application.

According to the invention, an access control system is provided in the environment which is arranged to lock or unlock access devices in the environment that protect an access-restricted area in said environment. The access control system is configured to communicate via a short range communication system, e.g. via Bluetooth, with at least one first mobile phone of a first user wanting to get access to at least one access-restricted area of said environment. The control system is further configured to communicate with a second communication device of a second user located in said environment and holding access rights to said access-restricted area.

After the first user enters the environment, the control system or the user itself initiates the first mobile phone via the short range communication system to send an access request to the second communication device. The access request is sent by the first mobile phone to the second communication device preferably via a public communication network, e.g. via a telephone network, but it could be sent alternatively via the short range communication system. The access request includes a unique ID of the first mobile phone, which unique ID is preferably the individual mobile phone number. The access request may—as it is described later on in detail—also comprise further data as the location of the first mobile phone, the time of arrival of the first user and eventually name of the first user. Upon receiving the access request from the first user the holder of the second communication device decides whether or not he wishes to grant access to the first user. If he does so, he grants access rights to the holder of the first mobile phone whereby he has principally two options which could be applied alternatively or together.

The first option is that the second user forwards via his second communication device access data to the control system, which access data comprises at least the unique ID of the first mobile phone. The access data may also comprise further information as the time of the arrival of the first user, the location of the first mobile phone and the second communication device, operation parameters (handicapped user) and the name of the first user. Furthermore, the forwarding of the access data to the control system may be performed either via a public network as for example a telephone network or internet or via a business owned network, e.g. via LAN or WLAN or via a cable connection of the second communication device to the access control system. The access control system is then able to unlock the access devices on the route between the position of the first mobile phone and the second communication device, which unlocking is always done when the first user gets into touch with a short range communication device in the vicinity of an access device on the route to the second communication device.

A part of the access control system, e.g. a central (access) control computer, needs not to be positioned within the environment but can be connected to the environment by any kind of communication network, e.g. internet.

The access devices may comprise any kind of person conveyors, e.g. elevators, escalators, moving ramps, walkway, automatic cars, busses and any kind of transportation devices.

Another option is that the second user sends from his second communication device, e.g. via a telephone network, unlock data directly to the first mobile phone whereafter the first mobile phone is able to open the access devices on a route between the location of the first mobile phone and the location of the second communication device. This alternative has the advantage that the access control system is not at all involved in the process of access grant to visitors of the environment. Also in the first alternative, the access control system is not involved in the process of granting access rights but only has the function to unlock the access devices on a route between the location of the first mobile phone and the second communication device when short range communication devices located in the vicinity of the access devices come into contact with the short transmission range of the first mobile phone.

Accordingly, the present invention facilitates the handling of visitors in access-restricted areas in a very smart way.

It has to be mentioned that the granting of the access rights via the second communication device means that the destination of the visitor has to be the location of the second communication device. The destination "unlocked" by the second communication device may be any point within the access-restricted area, e.g. a conference room.

In a preferred embodiment of the invention, the access control system initiates the first mobile phone to launch an application which executes the access request. This measure has the advantage that the first user is not required to perform any active steps to start the access request unless eventually the unlocking of an access code to enable the application to be launched on the first mobile phone. The application can either perform an automatic access request with a fixed second communication device or the application launched on the first mobile phone can offer a variety of second communication devices (second users) to be contacted for an access request. In this case, the user has of course an active role by choosing the desired destination in the environment. The application may also offer different destinations in the access-restricted area for the first user to choose. The application may then select based on the chosen destination the appropriate second communication device.

The requirement of inputting an access code for getting access to the application has the advantage that the access request cannot be started by any unauthorized person which accidentally holds the first mobile phone.

Preferably, the access data forwarded from the second communication device to the access control system or a central computer of the access control system comprises the location of the first mobile phone in the environment. Therefore the access control system may unlock only those access devices for the first mobile phone which are located on a route between the location of the first mobile phone and a destination in the access-restricted area, e.g. the location of the second communication device. Via this measure, the granting of access rights to the first user is limited only to a preselected route which improves the safety level of the system in general.

Correspondingly, in a second alternative, the unlock data which is sent from the second communication device to the first mobile phone is configured to unlock only those access devices for the first mobile phone which are located on a route between the arrival location of the first mobile phone in the environment (e.g. lobby) which may also be a default area, and a chosen or preset destination in the access-restricted area, e.g. the location of the second communication device or a conference room, visitor room, presentation room or the like.

Preferably, the access request comprises time data and the unlocking of the access devices by a short range communication between the first mobile phone and the short range communication devices in the vicinity of the access devices is valid only for a certain time period. In the second alternative, the unlock data is only valid for a certain time period. This measure ensures that the access rights are granted to the visitors only for a limited period which ensures that they can get from their arrival location in the environment to their destination. Therefore, the only time limited granting of access rights raises the safety level of the access handling in the environment essentially.

Preferably, the access request comprises the phone number of the first mobile phone as unique ID. This has the advantage that via the mobile phone number, the identity of the user of the first mobile phone can be tracked. Furthermore, this enables the second user of the second communication device to more easily identifying the visitor sending an access request.

In a preferred embodiment of the invention, after the granting of access rights to the first user, a guide system (application) is activated in the first mobile phone which initiates the first mobile phone to provide optical and/or acoustical guide information for the first user. By this measure, the first mobile phone cannot only be involved in the process of granting access rights, but can also advantageously be used to guide the first user along the route to his destination along which the access devices are enabled to be unlocked either by the access control system (computer) or by the unlock data received by the first mobile phone. This measure facilitates the orientation and the finding of the destination by the first user. Also this measure improves the safety of the access right handling in the environment, as the duration of the visitor in the access-restricted area is reduced.

The same holds true for the receipt of unlock data by the first mobile phone which receipt of unlock data may launch a guide system on the first mobile phone to issue optical and/or acoustical guide information for the first user. In this embodiment of the invention, the starting of the guide system on the first mobile phone advantageously takes place without any interaction with the access control system located in the environment.

In this connection it has to be clarified that the access control system is normally a microprocessor arrangement, e.g. a central computer, in the environment which manages the operation of the access devices in the environment. This central access control computer may be connected to each of the access devices and/or information for the access devices from the access control system may be communicated via data sets implemented on the first mobile phones when getting into short range communication with the short range communication devices located in the vicinity of the corresponding access devices.

The short range communication system may comprise independent Bluetooth® devices, e.g. transmitters and beacons.

In a preferred embodiment of the invention after each contact of the first mobile phone with a short range communication device of the access control system, the access control system, e.g. its central computer, stores the position of the first mobile phone in the access-restricted area together with the time of communication. By this measure the position of the visitor can easily be tracked if he should get lost in the environment.

In a preferred embodiment of the invention, the control system upon granting access rights to the first user transmits the unique ID, and preferably the mobile phone number if different, into an entrance allowance list handled by the control system. This measure enables the tracking of visitors later on in case a misuse of the system by a visitor should reveal.

In a preferred embodiment of the invention, the second communication device sends the unlock data via a public communication system to the first mobile phone, preferably via a telephone network or via internet whereby the communication takes place via the telephone broadcast network or via WLAN. This measure enables an easy direct exchange of data between the second communication device and the first mobile phone without the access control system (or its central computer) being involved.

Preferably, the access request is sent by the first mobile phone via an SMS or via a corresponding electronic message as e.g. WhatsApp, Skype or the like to the second communication device. This spares the provision of communication channels for this purpose in the access control system.

Preferably, the access request comprises control parameters of a passenger transport device located between the location of the first mobile phone and the location of the second communication device. The access request could for example comprise data about the status of the visitor, e.g. a handicapped passenger, a blind passenger, etc. In this case, the operation parameters of the transport device may be adapted to the special visitors' needs without any interaction of the first and second user.

In the following it should be clarified that following synonyms are used:

control system=access control system
access device=sliding or turning door, escalator, elevator (group)
first user=visitor
second user=holder of the second communication device The "Unique ID" may contain a phone number and/or a Bluetooth® ID of the first user's phone. The advantage of a Bluetooth® ID is that for example inside an elevator car the phone can be easily detected. The location data of the first phone may be Bluetooth® ID of the short range device 16 and/or some other unique location data that is send by the device 16.

Preferably the access request sent from the first phone does not only contain phone ID data (e.g. phone number and/or phone Bluetooth® ID) but also location ID data, e.g. the Bluetooth® ID of short range device 16 in the vicinity of the first user or in the vicinity of the entrance or lobby of the environment, and/or other unique location data, because this improves security, as the first user or visitor must be close to a defined location providing short range communication, e.g. an access gate when requesting access permission.

In case of an elevator system as access device, the definition of a route between the arrival location of the first mobile phone and the first user's destination preferably involves issuing of a destination call given automatically to the elevator system comprising the departure floor as well as the destination floor, when the first mobile phone get into the transmission range of a short range communication device located in the vicinity of the elevator system.

The invention further regards to an access control system of an environment configured to lock or unlock access devices in the environment. The control system is linked with a short range communication system configured to communicate with at least one first mobile phone held by a first user as to transmit initiation data to initiate the first mobile phone to be ready to issue an access request to a second communication device of a second user holding access rights to an access-restricted area of said environment.

In one embodiment of the invention the second communication device is configured to forward access data to the control system comprising the unique ID of the first mobile phone. Then the access control system after receiving the access data is able to unlock the access devices being located on the visitor's destination route based on a short range communication of the first mobile phone with a short range communication device located in the vicinity of the corresponding access devices.

In an alternative embodiment of the invention the second communication device sends unlock data to the first mobile phone. In this embodiment the unlock data enables the first mobile phone to unlock at least those access devices which are located on a route between the location of the arrival/sending of the first mobile phone in the environment and the first user's destination, e.g. the location of the second communication device.

With this access control system, the same advantages are obtained as described above in connection with the inventive method. The inventive access control system has a considerably less workload in the handling of access rights of visitors in the environment than known systems.

According to a preferred embodiment of the invention, the access devices comprise additionally to access doors also escalators and elevator systems.

Preferably, the access control system is linked or integrated with an escalator and/or elevator control system so that in the end the escalator/elevator control system may take over the access management in the environment. This reduces the effort for the access handling in the environment essentially and this is particularly advantageous as usually elevator systems already comprise a kind of access management system where users may be limited on certain routes within the elevator system according to their ID device presented to the elevator system.

In a preferred embodiment of the invention, the access data and/or unlock data comprises destination calls of the elevator system comprising a departure floor and a destination floor.

In a very simple and cost-effective solution of the invention, the second communication device is a second mobile phone. Of course, other second communication devices could be used as for example personal desktops, tablets, terminals, etc.

It is obvious for the skilled person that features and components of the independent claims can be provided as a single component or as multiple components. It is therefore obvious that the access control system is not only able to handle one first mobile phone but a large number of first mobile phones according to the number of visitors in the environment. It is further obvious that the access control system does not necessarily needs a central computer but functions of the access control system may be distributed to several components as the controls of the access devices.

Some further aspects of the invention are listed as follows:
The invention uses the fact that it is possible to locate a mobile device securely inside a building by using a system built on cheap Bluetooth® devices.
When the user enters the environment an App in the first mobile phone is activated and the App detects the location where the mobile device is, preferably via short range communication with a part of the access control system, e.g. a Bluetooth® device.
Normal access methods like PIN code, Touch ID, visual recognition or similar methods can be used when activating the application to make sure the user of the first mobile phone is authorized to use it.
If the person wants to get access to a certain building or floor or in general to a secure space inside the building, he can, by using the said App, send the access request comprising an SMS or a similar electronic message to the second communication device, e.g. a second mobile phone, an other mobile device or a fixed terminal of the person (second user) he/she wants to visit or who has the authority to control the access to the said space.
The access request would include preferably—as minimum—the indoor location of the mobile device (location got from the Bluetooth device(s) placed into the defined space), time when
the mobile device "read" the information available in the Bluetooth® device(s) as well the unique ID and the phone number of the mobile device and possible special information or parameters specifying if a special service is needed.
Special additional information in the access request could be for example:
if person is visually impaired voice guidance is needed
if person is in a wheel chair more time and space is needed
When the message arrives to the second communication device it will preferably give a signal (sound, visual, smell, vibration etc.) that there is a request to get access.

After necessary checking based on the available information got from the access request the second user will "unlock" remotely the necessary access devices preventing the access or providing the service.

Based on the command(s) sent by the second communication device and controlled by the second user having the control over the access rights to the necessary control systems controlling the gates, doors and elevators, any gates or doors can be unlocked as well elevators instructed to open the doors and take the person (or goods) to the space (e.g. floor) requested.

An additional security feature will be preferably activated also while a person or goods are inside the elevator cabin or near the gates or doors.

Preferably, when a person (or goods) enters the elevator, the Bluetooth® system placed inside the elevator cabin reads the unique ID of the mobile device with related time stamps.

Of course the first mobile phone of the person (first user) inside the cabin needs to be set to be visible—this is preferably done by the said App in the first mobile phone.

The elevator system will check automatically (since it knows that it has been assigned to provide a secure service) if the ID really has got the valid access rights to the said secure space and once the access rights are OK will perform the requested service providing also the necessary visual, voice, touch or smell guidance. If access rights are not OK the elevator system (or gate/doors system) will inform the passenger/person/system transporting the goods that he/she/it does not have valid access rights to access the said space and will instruct further steps to be taken.

It is also very well known that the "indoor location" accuracy, and thus the "security level" can be controlled by controlling the field strength and the amount of the Bluetooth® devices used in the Bluetooth® system.

BRIEF DESCRIPTION OF THE DRAWINGS

The invention is hereinafter described by the aid of an exemplary embodiment of the invention in connection with the schematic drawing.

This drawing shows an environment comprising an access control system.

DESCRIPTION OF THE PREFERRED EMBODIMENTS

FIG. 1 shows an office building as an example of an environment 10. The building 10 comprises an access control system 12 having a central access control computer 14 connected with short range communication devices 16 located in the vicinity of access devices as doors 18, elevator systems 20 and escalators 22. The central access control computer 14 is preferably located in the lobby of the building 10 where visitors 24 usually enter the building 10. The visitor 24 holds a first mobile phone 26 which is configured to communicate via a short range communication standard as e.g. Bluetooth®. The central access control computer 14 also has a short range communication device 16 so that when the visitor 24 enters the building 10, the central access control computer 14 communicates with the first mobile phone and initiates the first mobile phone 26 to launch an application which enables the first mobile phone 26 to send an access request to a second communication device 28, which is preferably located in the building 10, preferably in an access-restricted area thereof. The second communication device 28 is able to communicate with the first mobile phone directly, e.g. via a public communication network either via antenna 30 or via a cable 32. The public communication network may be preferably a telephone network but may also be an internet based communication standard, e.g. WhatsApp®, Skype®, Twitter® etc.

When the visitor 24 enters the building 10 and the central access control computer 14 has initiated the first mobile phone 26 to launch an application to issue the access request, the visitor 24 is prompted to insert an access code into the mobile phone to unlock the application. This feature shall prohibit the misuse of the first mobile phone by unauthorized persons. After having done so, the application either automatically or based on manual interaction of the visitor 24 issues an access request to the second communication device 28 which is a PC, a tablet, a terminal or a second mobile phone. The access request is sent via a local or public communication network, e.g. via telephone network or via internet and WLAN. The holder of the second communication device 28 (second user) can decide after receiving the access request from the first mobile phone 26 whether or not he intends to grant access rights to the visitor 24. If he denies, the visitor is not granted any access rights so that he is not able to pass any of the access devices 18, 20, 22 in the building 10 that seclude the access-restricted area.

If the second user intends to grant access rights to the visitor 24, he has two options. The first option is to send access data to the central access control computer 14 via a cable or line 32 in which case the central access control computer 14 unlocks all access devices 18, 20, 22 which are on the route between the arrival location of the visitor 24 in the building 10 and the visitor's destination, e.g. the location of the second communication device 28 in the building. The access devices 18, 20, 22 are unlocked after the mobile phone 26 gets into short range communication with a short range communication device 16 located in the vicinity of the corresponding access device 18, 20, 22. Via this measure, the access control system 12 is able to provide access rights to the visitor 24 either for all access devices 18, 20, 22 in the building or only for those access devices located on a direct route between the entrance location of the visitor 24 (location of the first mobile phone to send the access request) and the visitor's destination, e.g. the location of the second communication device 28.

Another option is that the second communication device 28 sends unlock data via its antenna 30 via a telephone network or another public communication network or even via the building network and short range communication to the mobile phone 26. The application launched at the mobile phone is then able to communicate with the short range communication devices 16 in the vicinity of the different access devices 18, 20, 22 to unlock them on the visitors' route to his destination (the second communication device 28). Also here, the unlock data can be specified as to unlock only those access devices 18, 20, 22 which are on a direct route between the entrance point of the visitor 24 in the building 10 and the location of the second coil device 28 in the building 10.

Furthermore, the first mobile phone 26 can be prompted by the central access control computer 14 or by the unlock data sent by the second communication device 28 to launch a guide application which may be combined or integrated with the access application to guide the visitor 24 on his route between the entrance location in the building 10 and his destination, e.g. the location of the second communication device 28.

Generally, the access request sent by the first mobile phone may include the entrance location of the first mobile phone if it is not the lobby of the building by default, an individual or unique ID of the first mobile phone, preferably the mobile phone number, a time of arrival of the visitor 24 in the building 10 and eventually certain parameters which are necessary for the operation of the elevator system, for example the notification of handicapped people which require special operation parameters of the elevator system.

The invention is not restricted to the above-mentioned embodiment but can be varied within the scope of the appended patent claims.

LIST OF REFERENCE NUMBERS

10 building (environment)
12 access control system
14 central access control computer
16 short range communication device
18 door
20 elevator system
22 escalator
24 visitor
26 first mobile phone
28 second communication device
30 antenna
32 cable

The invention claimed is:

1. A method for controlling access in an environment, the method comprising:
providing an access control system, the access control system locking and unlocking access devices in the environment;
when a first user enters the environment, the access control system automatically communicating, via a short range communication system of the access control system, with a first mobile phone of the first user wanting to get access to at least one access-restricted area of said environment,
wherein the automatic communicating includes causing the first mobile phone to launch an application, the application sending an access request to a second communication device of a second user, the second communication device initiating the access control system to grant access rights to the at least one access-restricted area to the first mobile phone in response to the access request, wherein the access request includes a unique ID of the first mobile phone,
wherein the initiating the access control system includes forwarding access data to the access control system comprising the unique ID of the first mobile phone; and
automatically unlocking, via the first mobile phone, only those access devices located on a route between a location of the first mobile phone and the at least one access-restricted area, which unlocking is based on a short range communication of the first mobile phone with short range communication devices, each short range communication device being located adjacent to a respective one of the access devices,
wherein the automatically unlocking includes separately unlocking each access device only via short range communication between the first mobile terminal and a short range communication device of the respective access device, and
wherein the access devices include at least one of a gate, a sliding door, a turning door, an escalator and an elevator group.

2. The method according to claim 1, wherein the access request further comprises location ID data including the location of the first mobile phone.

3. The method according to claim 1, wherein the launch of the application necessitates the input of an access code by the first user.

4. The method according to claim 1, wherein the access data comprises location data of the first mobile phone in the environment.

5. The method according to claim 1, wherein the access request comprises time data and the unlocking of the access control system by the access data is valid only for a certain time period.

6. The method according to claim 1, wherein the access request comprises the phone number of the first mobile phone as the unique ID.

7. The method according to claim 1, wherein the access control system upon granting access rights initiates a guide system which initiates the first mobile phone to indicate optical and/or acoustic guide information for the first user.

8. The method according to claim 1, wherein the first mobile phone upon receiving access rights launches a guide system to issue optical and/or acoustic guide information for the first user.

9. The method according to claim 1, wherein the access control system upon granting access rights to the first mobile phone transmits the unique ID into an entrance allowance list, handled by the access control system.

10. The method according to claim 1, wherein the access request is sent via an SMS or a corresponding electronic message.

11. The method according to claim 1, wherein access request comprises control parameters of a passenger transport device located between the location of the first mobile phone and the location of the second communication device.

12. An access control system of an environment configured to lock and unlock access devices in the environment, the access control system including a short range communication system configured to communicate with at least one first mobile phone held by a first user wanting to get access to at least one access-restricted area of said environment, wherein the access control system is configured to:
when the first user enters the environment, automatically communicate, via the short range communication system, with the first mobile phone to cause the first mobile phone to launch an application, the application sending an access request to a second communication device of a second user holding access rights to the at least one access-restricted area of said environment, wherein the second communication device is configured to forward access data to the access control system to initiate the access control system to grant access rights to the at least one access-restricted area to the first mobile phone in response to the access request, the access data comprising a unique ID of the first mobile phone, and
automatically unlock, via the first mobile phone, only those access devices which are located on a route between a location of the first mobile phone and the at least one access-restricted area, wherein the unlocking is based on a short range communication of the first mobile phone with short range communication devices, each short range communication device being located adjacent to a respect one of the access devices, wherein the automatically unlocking includes separately unlocking each access device only via short range communication between the first mobile terminal and a short range communication device of the respective access device, and wherein the access devices include at least one of a gate, a sliding door, a turning door, an escalator and an elevator group.

13. The access control system according to claim 12, wherein the access devices comprise an escalator and elevator systems and/or vehicles.

14. The access control system according to claim 13, wherein the access control system is linked or integrated with an escalator/elevator control system.

15. The access control system according to claim 12, wherein the access data comprises destination calls of the elevator system comprising a departure and a destination floor.

16. The access control system according to claim 12, wherein the second communication device is a second mobile phone.

* * * * *